(12) United States Patent
Shi

(10) Patent No.: US 9,746,022 B2
(45) Date of Patent: Aug. 29, 2017

(54) SUCTION CUP WITH FLAT FRAMEWORK

(71) Applicant: ZHONGSHAN TAILI HOUSEHOLD PRODUCTS MANUFACTURING CO., LTD., Zhongshan (CN)

(72) Inventor: Zhengbing Shi, Zhongshan (CN)

(73) Assignee: ZHONGSHAN TAILI HOUSEHOLD PRODUCTS MANUFACTURING CO., LTD., Zhongshan, Guangdong (CN)

( * ) Notice: Subject to any disclaimer, the term of this patent is extended or adjusted under 35 U.S.C. 154(b) by 0 days.

(21) Appl. No.: 14/380,375

(22) PCT Filed: Nov. 19, 2013

(86) PCT No.: PCT/CN2013/087410
§ 371 (c)(1),
(2) Date: Aug. 22, 2014

(87) PCT Pub. No.: WO2014/075642
PCT Pub. Date: May 22, 2014

(65) Prior Publication Data
US 2015/0240862 A1    Aug. 27, 2015

(30) Foreign Application Priority Data

Nov. 19, 2012  (CN) ..................... 2012 2 0613987 U
Mar. 8, 2013   (CN) .......................... 2013 1 0075268
(Continued)

(51) Int. Cl.
*F16B 47/00*    (2006.01)
*F16M 13/02*    (2006.01)

(52) U.S. Cl.
CPC ........... *F16B 47/00* (2013.01); *F16M 13/022* (2013.01); *F16B 47/006* (2013.01)

(58) Field of Classification Search
CPC ...... F16B 47/00; F16B 47/006; F16M 13/022
(Continued)

(56) References Cited

U.S. PATENT DOCUMENTS 2,047,658 A * 7/1936 Zaiger ...................... B60J 1/002
                                                       248/205.8
4,133,575 A * 1/1979 Mader ........................ B60J 1/20
                                                       248/205.8
(Continued)

FOREIGN PATENT DOCUMENTS

GB   WO 2012120268 A1 *  9/2012   ............. A47K 10/10
JP         2001208035 A  *  8/2001

*Primary Examiner* — Muhammad Ijaz
(74) *Attorney, Agent, or Firm* — Bei & Ocean; George G. Wang

(57) ABSTRACT

A suction cup, including a flat framework, a suction cup body covering the framework, a connection rod disposed on the back surface of the framework and passing through the cup body, a cup cover covering the connection rod and the cup body, and a pressing element provided on the back surface of the cup cover and in connection with the connection rod, a seal element on the adsorption surface of the cup body, and an annular protruding ring on the inner surface of the cup cover at a location corresponding to the seal element for touch pressing the inner surface of the cup body against the seal element. The invention uses rigid force transfer, and thus the force transfer is more effective. The sealing element enhances the airtightness of the suction cavity and increases the absorption force of the suction cup. When pulling the connection rod, due to the existence of the sealing element, the air cannot easily enter the suction cavity, and because before the pulling the framework is in a flat state, it can produces a high degree of vacuum and thus adsorption force so that the suction cup will not fall off the (Continued)

supporting surface easily. Furthermore, the suction cup of the invention is structurally simple with a lower manufacturing cost.

7 Claims, 11 Drawing Sheets

(30) Foreign Application Priority Data

| Mar. 8, 2013 | (CN) | ................... 2013 2 0107297 U |
| Mar. 8, 2013 | (CN) | ................... 2013 2 0107438 U |
| Mar. 8, 2013 | (CN) | ................... 2013 2 0108046 U |
| Sep. 6, 2013 | (CN) | ......................... 2013 1 0404114 |
| Sep. 6, 2013 | (CN) | ......................... 2013 1 0404140 |
| Sep. 6, 2013 | (CN) | ......................... 2013 1 0405292 |
| Sep. 6, 2013 | (CN) | ................... 2013 2 0554911 U |

(58) Field of Classification Search
USPC ...... 248/467, 683, 537, 205.5, 205.8, 206.2, 248/206.3, 309.3, 362, 363
See application file for complete search history.

(56) References Cited

U.S. PATENT DOCUMENTS

| 5,087,005 | A * | 2/1992 | Holoff ................ A47G 23/0225 248/205.8 |
| 5,104,077 | A * | 4/1992 | Liu ........................ F16B 47/00 248/205.8 |
| 6,386,494 | B1 * | 5/2002 | Huang ................... A47K 10/04 211/119.009 |
| 6,478,271 | B1 * | 11/2002 | Mulholland ............ F16B 47/00 248/205.8 |
| 6,666,420 | B1 * | 12/2003 | Carnevali ............... F16B 47/00 248/205.8 |
| 6,932,306 | B2 * | 8/2005 | Zou ........................ F16B 47/00 248/205.5 |
| 7,708,245 | B2 * | 5/2010 | Woo ........................ G09F 7/12 248/205.7 |
| 7,850,133 | B2 * | 12/2010 | Carnevali ............... F16B 47/00 248/205.5 |
| 7,975,971 | B2 * | 7/2011 | Carnevali ............... F16B 47/00 248/205.5 |
| 8,496,222 | B2 * | 7/2013 | Li ........................ F16B 47/006 248/205.5 |
| 2002/0113181 | A1 * | 8/2002 | Zou ........................ F16B 47/00 248/205.5 |
| 2005/0218278 | A1 * | 10/2005 | Hsu ........................ F16B 47/00 248/205.5 |
| 2006/0027720 | A1 * | 2/2006 | Wu ........................ F16B 47/00 248/205.5 |
| 2007/0023594 | A1 * | 2/2007 | Choi ...................... F16B 47/00 248/205.5 |
| 2007/0075196 | A1 * | 4/2007 | Richter ................ F16B 47/006 248/205.8 |
| 2007/0120027 | A1 * | 5/2007 | Chang ................... B60R 11/02 248/205.5 |
| 2007/0210225 | A1 * | 9/2007 | Carnevali .............. F16B 47/00 248/205.8 |
| 2007/0215766 | A1 * | 9/2007 | Yen ...................... F16M 11/105 248/205.8 |
| 2007/0241246 | A1 * | 10/2007 | Ristau ..................... F16B 47/00 248/206.2 |
| 2007/0246621 | A1 * | 10/2007 | Akai ....................... F16B 47/00 248/205.5 |
| 2007/0290105 | A1 * | 12/2007 | Liu ...................... F16B 47/006 248/205.5 |
| 2008/0224009 | A1 * | 9/2008 | Song ..................... F16B 47/003 248/309.3 |
| 2008/0251664 | A1 * | 10/2008 | Hara ...................... F16B 47/00 248/205.8 |
| 2010/0140437 | A1 * | 6/2010 | Orban .................... F16B 47/00 248/363 |
| 2010/0282928 | A1 * | 11/2010 | Hsu ....................... F16B 47/003 248/205.4 |
| 2011/0168856 | A1 * | 7/2011 | Tu ........................ F16B 47/006 248/205.6 |
| 2011/0315839 | A1 * | 12/2011 | Chen ..................... F16B 47/006 248/205.8 |
| 2012/0275141 | A1 * | 11/2012 | Keith ........................ F21L 4/00 362/158 |
| 2012/0287560 | A1 * | 11/2012 | Fan ........................ F16B 47/00 361/679.01 |
| 2013/0277510 | A1 * | 10/2013 | Chiu .................... F16M 11/041 248/126 |
| 2014/0084118 | A1 * | 3/2014 | Tooley ................... A47K 10/10 248/205.3 |

* cited by examiner

SUCTION CUP WITH FLAT FRAMEWORK

FIELD OF THE INVENTION

This invention relates to a type of suction cup for civilian use, in particular a type of suction cup with a flat framework.

BACKGROUND OF THE INVENTION

Suction cups for civilian use are mainly for people to hang articles on a supporting surface such as walls. As it can be relocated to any positions at will, it can be conveniently used to hang towels, clothing articles, etc. Such suction cup is easy to use and can maintain attachment via vacuum assisted by adhesion, without drilling on the wall, it has therefore been widely used.

Existing suction cups may be made with or without a framework. Traditional suction cup without a framework is normally made of soft plastic integrally formed by injection molding. However, such suction cup cannot fully discharge air between the cup's adsorption surface and the supporting surface, and air may easily seep in via the edge of the adsorption surface, the adsorptive force is thus reduced and insufficient. The suction cup without a framework developed subsequently mainly consists of a fixing handle, a cup body, a cup cover placed on the cup body, a connecting rod provided at the center of the cup body, penetrating the cup cover and connecting to the fixing handle, and a spring loaded on the connecting rod. A force applied on the fixing handle pulls up the cup body via the connecting rod, so that vacuum (negative pressure) is generated between the suction cup body and the wall surface, thereby holding the suction cup onto the wall surface. However, this type of suction cup has a complicated structure and high production cost, it is not easy to operate, and its adsorptive force is not strong.

For conventional suction cup with a framework, the framework can transfer the pressing force very well, adsorptive force is thus greatly increased. Therefore, structural improvement of the suction cup with a framework has become the trend of R & D efforts of the industry.

At present, a conventional suction cup with a flat framework normally consists of a framework, a suction cup body covering the framework, a connecting rod on the back of the framework, a cup cover which is on the connecting rod and covers the back of the cup body, and a hanging hook provided on the back of the cup cover and connected to the connecting rod for pressing and pulling the framework. When fixing such suction cup on the wall surface, first put the suction cup on the wall surface, and then apply an external force to pull up the connecting rod and deform the framework (from the original flat form), creating a vacuum cavity between the suction cup body and the wall surface. At the same time, under the action of the external force, the cup cover transfers the force for counteracting on the cup body, limiting its deformation, preventing the external air from entering the vacuum cavity. Under such mutual counteraction, the suction cup body is attached to the wall surface. The term "wall surface" means any supporting surfaces for hanging articles.

However, adsorptive force of existing suction cup with flat framework is not large enough, so that the suction cup easily falls from the wall surface, in particular when conditions of the wall surface are not ideal (for example, the wall surface is too smooth or has sags and crests), the friction force between the suction cup and the wall surface is too small, resulting in falling off of the suction cup. Thus, it cannot meet the need in terms of handing capacity and durability.

SUMMARY OF THE INVENTIONS

An object of this invention is to provide a type of suction cup with a flat framework that has a simple structure, can effectively transfer pressing forces, has a large adsorptive force, and does not easily fall off from the supporting surface.

This object is realized by the following technical measures: a type of suction cup, comprising a flat framework, a cup body covering the framework, a connecting rod which is provided on back surface of the framework and passes through the cup body, a cup cover which is disposed on the connecting rod and covers the back surface of the cup body, and a pressing element provided on back surface of the cup cover and connected to the connecting rod; wherein a seal element is provided on the adsorption surface of the cup body and protruding rings are provided on inner surface of the cup cover used to touch and press on the back surface of the cup body at locations corresponding to the seals.

In the present invention, the cup body is placed onto the supporting surface and a force is applied to the pressing element, which pulls the connecting rod and deforms the cup body, hence creating a vacuum cavity between the suction cup body and the supporting surface. Additionally, the force is rigidly transferred to the cup body via protruding rings on the cup cover, then acting on the framework and counteracting on the cup body, limiting is deformation. Under such mutual interactions, the suction cup body is closely attached to the supporting surface. Owing to the rigid force transfer, the force transfer is efficient. The seal element can improve the airtightness of the vacuum cavity and increase the adsorptive force of the suction cup. During the pulling, the seal element provides assistance so that the air will not easily enter the vacuum cavity. Before pulling to create the vacuum, the framework is flat, so that a high degree of vacuum, thus a large adsorptive force, can be achieved by the pulling and the suction cup will be less likely to fall off. In addition, this invention has a simple structure and low production cost.

As an improvement of this invention, on the circumference of the back surface of the framework there are provided annular protruding ribs, which extend via through holes provided on the back surface of the cup body which allow the annular protruding ribs extend into and expose on the back surface of the cup body. The protruding rings' positions correspond to positions of the annular protruding ribs, which directly receive the pressing force from the cup cover and transfer the force rigidly via the protruding rings.

In the present invention, the annular protruding ribs on the framework include an inner annular protruding rib and an outer annular protruding rib, with the outer rib enclosing the inner rib. The protruding rings include an inner protruding ring used to touch and press the inner annular protruding rib and an outer protruding ring used to touch and press the outer annular protruding rib. The outer protruding ring encloses the inner protruding ring. The position of the inner protruding ring corresponds to the position of the inner annular protruding rib and the position of the outer protruding ring corresponds to the position of the outer annular protruding rib. An external force is applied to the pressing element, pulling the connecting rod and deforming the cup body, and at the same time the external force is transferred to the inner annular protruding rib via the inner protruding ring on the cup cover, and to the outer annular protruding rib via the outer protruding ring, and hence rigidly transferred to the cup body, counteracting the cup body and limiting its deformation.

As a further improvement of the present invention, on the inner surface of the cup cover, a central protruding ring enclosing the center of the cup cover is provided, which is enclosed within the inner protruding ring. The central protruding ring corresponding to the position between inner side of the inner annular protruding rib and the place where the framework connects the connecting rod.

As a preferred embodiment of the present invention, when the suction cup is in a suction state on the supporting surface, the outer side of the central protruding ring on the cup cover is at the inner side of the seal element on its outer surface. At this time, the seals is prevented from being further pulled into (or totally into) the inside of the central protruding ring, thus ensuring a sealing contact between the seal element and the supporting surface, preventing leakage of air due to gap therebetween, and ensuring a sufficient vacuum adsorptive force.

This invention can also be improved as follows: the seal element extends from the cup body's adsorption surface, forming a contact friction surface between the seal element and the edge of the cup body's adsorption surface, thus ensuring a sufficient vacuum adsorptive force and a friction force.

As a recommended implementation mode of this invention, installation grooves are provided on the cup body's adsorption surface and the seal elements are installed in these grooves and extend out from the opening of the grooves.

In the present invention, bonding effect of the seal element is higher than that of the cup body. The seal elements are more easily attached to the supporting surface, enhancing sealing effects. Besides, bonding between the seal elements and cup body is strong, so that they do not easily separate.

In the present invention, the cup body and the seals are integrally formed.

As an embodiment of this invention, the seal elements are sealing rings. The sealing rings enclose center of the cup body's adsorption surface. A contact friction surface is formed between the sealing rings and the peripheral of the cup body.

In the present invention, the inner protruding ring comprises radial protruding ribs distributed on a circle enclosing the central protruding ring. The radial protruding ribs extend from the central protruding ring to the outer protruding ring. The central protruding ring is higher than the outer protruding ring. Top surface of the radial protruding ribs inclines from the central protruding ring toward the outer protruding ring. The central protruding ring plays both roles of transferring the force and limiting excessive deformation of the suction cup, which would otherwise pull the seal rings off the supporting surface, lower the degree of vacuum and adsorption force of the suction cup.

The seal element can be a sealing gasket at a central location of the adsorption surface of the cup body and a contact friction surface is formed between the sealing gasket and the edge of the suction body.

The present invention can also be improved as follows: on the circumferential edge on back surface of the framework, there is provided an annular step, which steps up toward the back surface of the framework. The inner annular protruding rib comprises a number of radial protruding ribs distributed on the circumference. The outer annular protruding rib is located on the edge of the upper stage of the annular step and the radial protruding ribs on the framework are located on the lower stage of the annular step. The annular step can increase the room for elastic deformation of the framework. Since the area on the front of framework corresponding to the upper stage is an annular notch, during injection molding, the soft gel material will be slightly thicker at this notch, and when being pressed, this part will deform more easily, better adapting to a coarse supporting surface.

In the present invention, some radial cuts distributed along the circumference of the framework may be provided, truncating the outer annular protruding rib, so that this rib comprises a number of bulges in a circle.

The radial cuts facilitate running of the material during the secondary injection of plastic in forming the suction cup, facilitating a complete wrapping of the framework by the soft plastic material, making the framework an integral part of the cup body. Further, a number of the single fragments formed by radial cuts perform a function mimicking a "grasping" action, similar to the fingers of the human palm. In particular, on some uneven, coarse, dense, or airtight supporting surfaces, each single fragment can be adsorbed to a position with a different height on an uneven supporting surface, realizing automatic adjustment to the unevenness of the surface. As a result a stronger adsorptive force is generated when the adsorption surface of the suction cup body is in contact with the supporting surface, as well as a stronger friction force. Therefore, the suction cup of this invention can be better suited for attaching to uneven, rough, dense, and airtight supporting surfaces.

As further improvement of the invention, the radial cuts include short cuts and long cuts, wherein the long cuts extend from a position near the center to the edge of the framework, and the short cuts are at the edge of the framework with a length of ⅓-¾ of the length of the long cuts. The short cuts are on the upper stage of the annular step. The long and short cuts are arranged alternately to form a number of Y-shaped forks, with the bulges located at the opening ends of the Y-shaped fork. The alternate arrangement of the short and long cuts of this invention can ensure strength of each Y-shaped fork, while avoiding any reduction in adsorptive force due to an insufficient strength of each single fragments and reduced total number of single fragments due to the cuts.

As a further improvement of the invention, an annular coarse area is provided near the edge of the cup body's adsorption surface, and a smooth area is provided between the annular coarse area and the edge of the adsorption surface. This annular coarse area can increase the friction force between the adsorption surface and the supporting surface, to further enhance adsorptive force of the suction cup, so that it will not fall off easily.

As a particular embodiment of the invention, the annular coarse area is a complete ring-like circular area.

As another implementation mode of this invention, the annular rough part consists of a number of rough strips on a circumference, with smooth part provided between adjacent rough strips.

Preferably, the rough surface of the rough ring and rough strips has eroded veins or net veins.

In this invention, the connection area between the connecting rod and the framework may be provided with reinforcing bars distributed on the circumference.

To further enhance adsorptive force of the suction cup, the following improvement can also be made to this invention:

The pressing part includes a nut sleeve and a hook. The connecting rod is a screw rod and the hook is put on the screw rod and between back surface of the cup cover and the nut sleeve. The nut and screw match each other. After the cup body is placed onto the supporting surface, the nut sleeve can be rotated down to pull up the screw rod, deforming the cup body.

On back surface of the cup cover, a locating hole is provided. On the hook, a locating column corresponding to the locating hole is provided so that the column is inserted in the locating hole to fix the hook on the cup cover.

The pressing element is hinged to the connecting rod. The connecting end of the pressing part of cam-shaped. After the cup body is placed onto the supporting surface, the protruding part of this connecting end can be pressed against the back surface of the suction cup cover, thereby pulling up the connecting rod and deforming the suction cup body.

To further enhance the airtight property of the suction cup and increase contact area and adsorptive force, the circumferential edge of the cup body may include lip rims extending outward, which have the shape of a thin sheet. The edge of cup cover is pressing against the lip rims.

The present invention has the following advantages over the prior art:

(1) The force is transferred to the framework via protruding rings. This is rigid transfer of force and has better transfer efficiency. The seal element can enhance airtightness of the vacuum cavity and adsorptive force of the suction cup. With assistance of the seal element, during the pulling of the connection rod, air cannot easily enter the vacuum cavity. In addition, since the framework is flat before the pulling, a higher degree of vacuum can be achieved, hence a larger adsorptive force.

(2) When the suction cup reaches the suction state, the seals cannot be pulled into (or totally pulled into) inside of the central protruding ring, thus ensuring sealing contact between the seal element and the supporting surface, preventing leakage of air due to gap between them, and ensuring sufficient vacuum adsorptive force.

(3) Radial cuts are used to deform the framework when pressed, which also facilitates the running of injection molding material during secondary injection in forming the suction cup, and facilitates a total wrapping of the framework by the soft material to make it an integral part of the suction cup body. Furthermore, the individual fragments formed by radial cuts can function in a "grasping" action, similar to the fingers of the human palm. In particular, on uneven, coarse, dense, and airtight supporting surfaces, each individual fragment can be adsorbed to a position of varying heights on the supporting surface, realizing automatic adjustment to actual surface conditions. Therefore, the suction cup of this invention can be better suited to be used on uneven, rough, dense, and airtight supporting surfaces.

(4) Alternate arrangement of short and long cuts of this invention can ensure strength of each Y-shaped fork, to overcome the insufficient strength of individual fragments and reduced number of the fragment due to the cuts.

(5) The seal element can further enhance sealing performance of the vacuum cavity, increasing adsorptive force of the suction cup, while forming sealing friction surfaces between seals and edge of suction cup body, thus ensuring sufficient vacuum adsorptive force and friction force.

(6) The annular rough area on the cup's adsorption surface can increase friction force between the adsorption surface and the supporting surface, to further enhance adsorptive force of the suction cup, so that it will not fall easily.

(7) In this invention, the lip rims can further enhance the airtight property of the vacuum cavity between the suction cup body and the supporting surface, and increase contact area and adsorptive force.

(8) The annular step can increase space of elastic deformation of the framework. Since the part of front of framework corresponding to upper stage of the annular step is an annular notch, during molding injection, the soft plastic material will be slightly thicker at this notch, and when being pressed, this part will more easily deform, making it more adaptable to a rough supporting surface.

BRIEF DESCRIPTION OF THE DRAWINGS

The following further describes this invention in details in combination with the figures below.

FIG. 5-1 is a section view of embodiment 3 of the invention before entering the suction state.

FIG. 5-2 is a section view of embodiment 3 of the invention in the suction state.

FIG. 5-3 is a section view of embodiment 2 of the invention before entering the suction state.

FIG. 5-4 is a section view of embodiment 2 of the invention in the suction state.

FIG. 8-1 is a bottom view of suction cup body's adsorption surface of embodiment 7 of the invention.

FIG. 8-2 is a bottom view of suction cup body's adsorption surface of embodiment 8 of the invention.

FIG. 8-3 is a bottom view of suction cup body's adsorption surface of embodiment 9 of the invention.

DETAILED DESCRIPTION OF PARTICULAR EMBODIMENTS OF THE INVENTION

Embodiment 1

Figure 1:
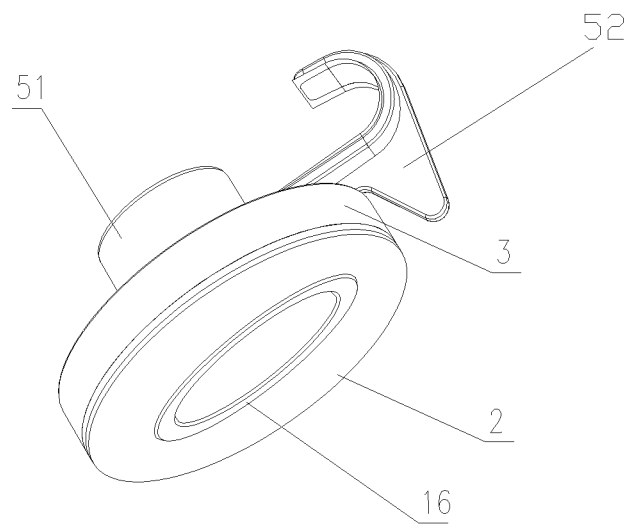
FIG. 1 is an overall structural diagram of embodiment 1 of the invention.

Shown in FIG. 1-FIG. 4, is a type of suction cup with a flat framework disclosed of the present invention, comprising a flat framework 1, a cup body 2 covering framework 1, a connecting rod 101 provided on the back surface of framework 1 and passing through cup body 2, a hat-shaped suction cup cover 3 put on this connecting rod 101 and covering the back surface of cup body 2, and a pressing element provided on back surface of cup cover 3 and connected to the connection rod 101; wherein seal elements are provided on adsorption surface of suction cup body 2 and protruding rings are provided on inner surface of suction cup cover 3 used to touch and press the back surface of cup body 2 at the area corresponding to the seal elements. Framework 1 extends from the center to near the edge of cup body 2. Annular protruding ribs are provided on the circumference of the back surface of framework 1, extending into through holes provided on the back surface of cup body 2 so that the annular protruding ribs are exposed on the back surface of the cup body. Top surface of the annular protruding ribs is flush with the back surface of the cup body. Positions of the protruding rings correspond to the positions of the annular protruding ribs, and these ribs directly receive the pressing force from the cup cover and transfer this force rigidly via the protruding rings. Put cup body 2 onto a supporting surface 10 and apply a force on the pressing element to pull the connection rod and deform the cup body, so that vacuum cavity 9 is formed between the cup body and supporting surface 10. The external force is rigidly transferred to framework 1 via protruding rings on the cup cover and then to cup body 2, counteracting on the cup body to limit its deformation. With the mutual counteraction, the suction cup is closely attached to supporting surface 10.

In this embodiment, annular protruding ribs on framework 1 include an inner annular protruding rib 122 and an outer annular protruding rib 123, with the outer rib 123 enclosing the inner rib 122. The height of both inner and outer annular protruding ribs is 1.0-2.0 mm. The protruding rings include a central protruding ring 301 enclosing the center of the inner surface of cup cover 3, an inner protruding ring 302 used to touch and press the inner annular protruding rib 122, and an outer protruding ring 303 used to touch and press the outer annular protruding rib 123. The outer protruding ring 303 encloses the inner protruding ring 302, and the inner protruding ring 302 encloses central protruding ring 301. The position of the inner protruding ring 302 corresponds to the position of the inner annular protruding rib 122 and the position of the outer protruding ring 303 corresponds to the position of the outer annular protruding rib 123. The central protruding ring corresponds to the part between inner side of the inner annular protruding rib and the place where the framework connects the connecting rod. The force is applied to the pressing element, to pull the connecting rod and deform the cup body, and at the same time, this force is transferred to the inner annular protruding rib via inner protruding ring on the cup cover, to the outer annular protruding rib via the outer protruding ring, and hence is rigidly transferred to the cup body, counteracting the cup body and limiting its deformation.

In this embodiment, the seal element is sealing ring 16, made of PU polymeral material. Cup body 2 and sealing ring 16 are formed as an integral part. Bonding effect of sealing ring 16 is higher than that of cup body 2. On the adsorption surface of cup body 2, an installation groove is provided and the sealing ring is installed in the groove. Sealing ring 16 encloses the center of cup body 2's adsorption surface and extends from the opening of the groove. A contact friction surface is formed between sealing ring 16 and edge of suction cup body 2. When the suction cup is placed against the supporting surface, outer ring surface 301*b* of central protruding ring 301 on the cup cover is situated at inner side 4*b* of seal ring 16 on the outer surface. When the suction cup is sucked closely against the supporting surface, the sealing element cannot be pulled into (or completely pulled into) inside of the central protruding ring, thus ensuring sealing between the sealing element and the supporting surface, avoiding air leakage in the gap between them, and ensuring a sufficient vacuum adsorptive force.

On the circumferential edge on the back surface of framework 1, an annular step 6 bulging toward the back surface of the framework is provided. The step height of annular step 6 is 1.0-2.0 mm. Inner annular protruding rib 122 comprises a number of radial protruding ribs distributed on the circumference. Outer annular protruding rib 123 is located on the edge of upper stage of annular step 6 and radial protruding ribs on framework 1 are located on lower stage of annular step 6. On framework 1, radial cuts distributed along its circumference are provided, truncating the outer annular protruding rib, so that this rib comprises a number of bulges in a circle, which receive force from the cup cover and transfer it rigidly via the outer protruding ring. The cuts include short cuts 7 and long cuts 8, wherein long cuts 8 extend from a position near the center of framework 1 to its edge, with the distance between the starting position of long cut 8 and center of framework 1 being about 8-15 mm. Short cuts 7 are at the edge of framework 1 and have length of ⅓~¾ of the length of long cut 8. Short cuts 7 are on the upper stage of the annular step. The short and long cuts are arranged alternately to form a number of Y-shaped forks 102, with the bulges located at both opening ends of such Y-shaped fork. The connection part between the connecting rod and the framework is provided with reinforcing bars 11 distributed on the circumference. On the framework, plastic injection hole 121 is also provided.

The pressing element includes a nut sleeve 51 and a hook 52. The connecting rod is a screw rod and the hook is put on the screw rod and between the rear side of the cup cover and the nut sleeve. The nut and screw match each other. After the cup body is placed onto the supporting surface, the nut sleeve can be rotated down to pull up the screw rod, deforming the suction cup body. On the back surface of the cup cover, a locating hole 305 is provided. On hook 52, a locating column 53 corresponding to the locating hole 305 is provided so that the column can be inserted into the locating hole to fix the hook on the cup cover. Circumferential edge of the cup body includes lip rims 24 extending outward, in a form of thin sheet. Edge 304 of the cup cover presses on the lip rims.

The operating principle of this invention: First, place the suction cup against the supporting surface so that there is almost no air in-between (a near vacuum state). Then, apply force to pull the connecting rod on suction cup's framework to deform the cup body and create negative pressure (vacuum) cavity between the suction cup and the supporting surface. This external force is rigidly transferred to the cup body via the cup cover (non-deforming). Under the limiting force transferred by annular ribs on the cup cover, as the external air cannot enter the vacuum cavity due to airtightness between the suction cup and the supporting surface, deformation of the cup body is limited. Thus, with such mutual counteractions, the suction cup is firmly attached to the supporting surface. In other words, the cup cover does not deform, and transfers the force rigidly and directly.

Embodiment 2

As shown in FIG. 5-3, FIG. 5-4, and FIG. 9-FIG. 12, the difference between embodiment 2 and embodiment 1 is described as follows: inner protruding ring 302 comprises radial protruding ribs distributed on a circumference enclosing central protruding ring 301, with these radial protruding ribs extending from central protruding ring 301 to outer protruding ring 303. Central protruding ring 301 is higher than outer protruding ring 303 and the top surface of radial protruding ribs inclines from central protruding ring 301 toward outer protruding ring 303.

Embodiment 3

Figure 2:
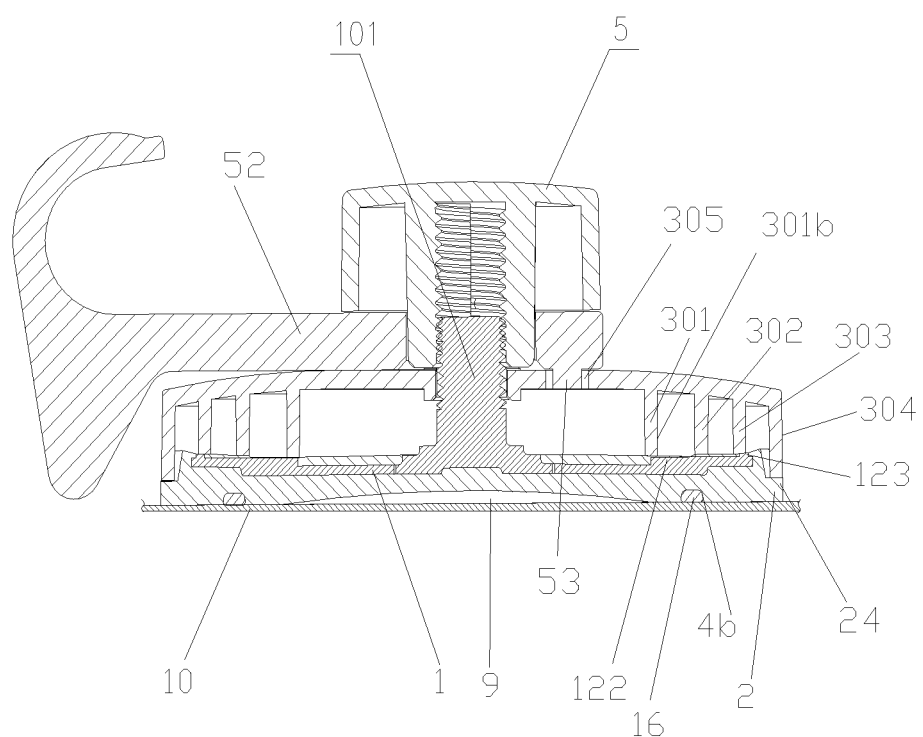
FIG. 2 is a section view of embodiment 1 of the invention with the cup body in the suction state.
Figure 5:
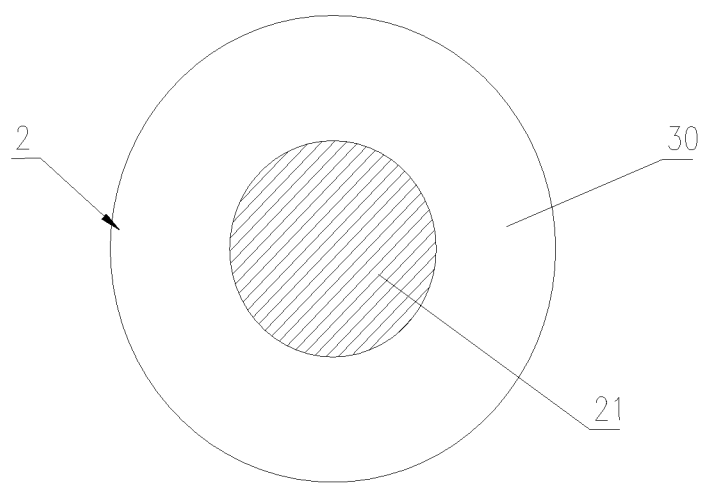
FIG. 5 is a bottom view of the cup body's adsorption surface of embodiment 3 of the invention.
Figures 1, 5:
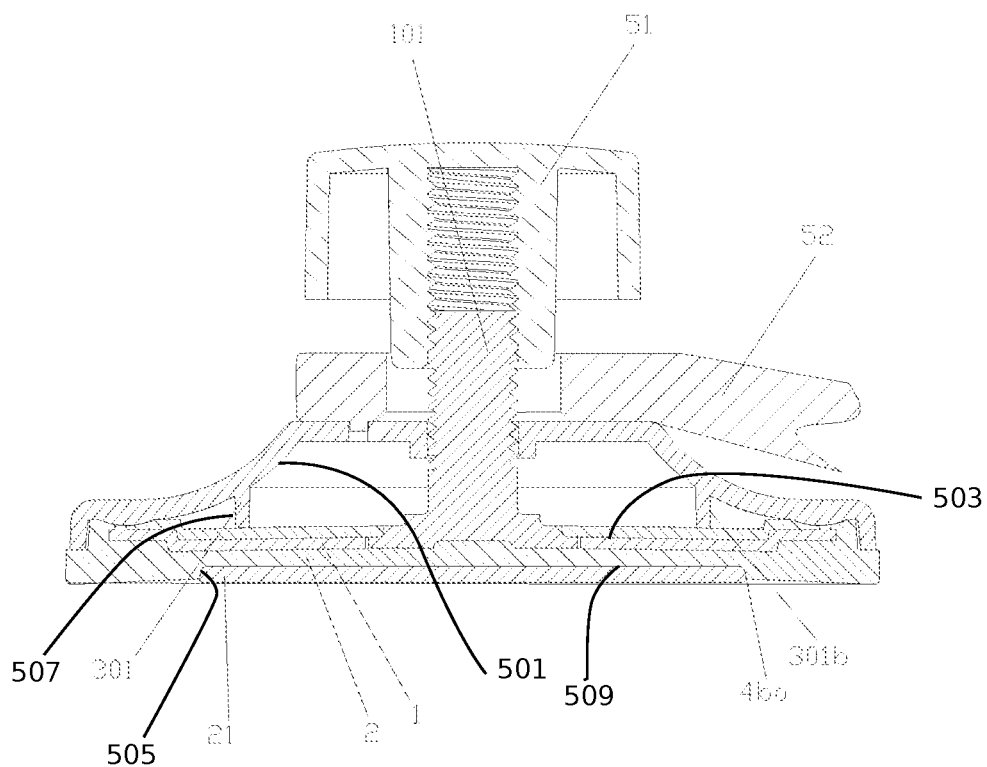
Figures 2, 5:
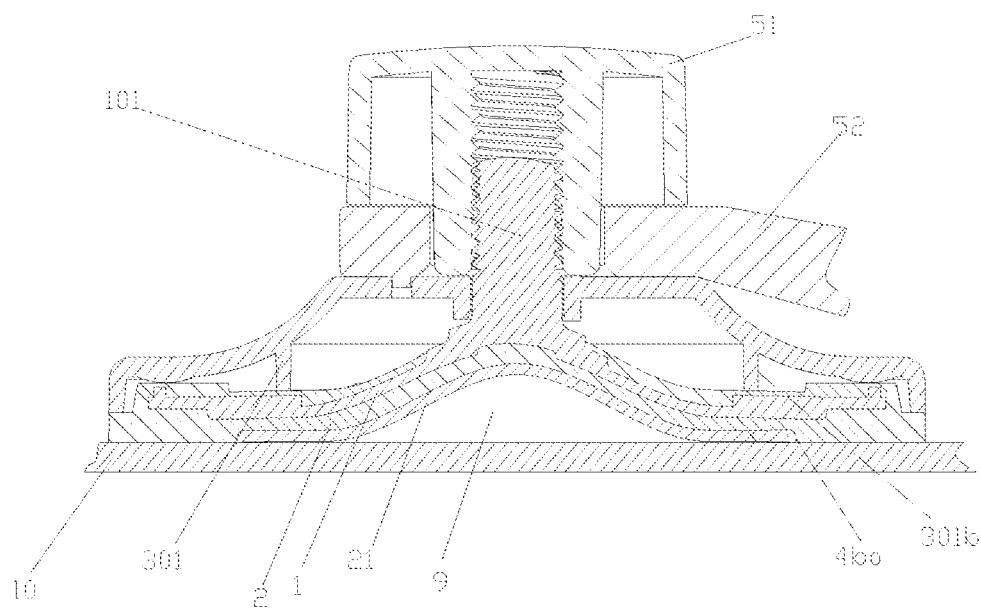
Figures 3, 5:
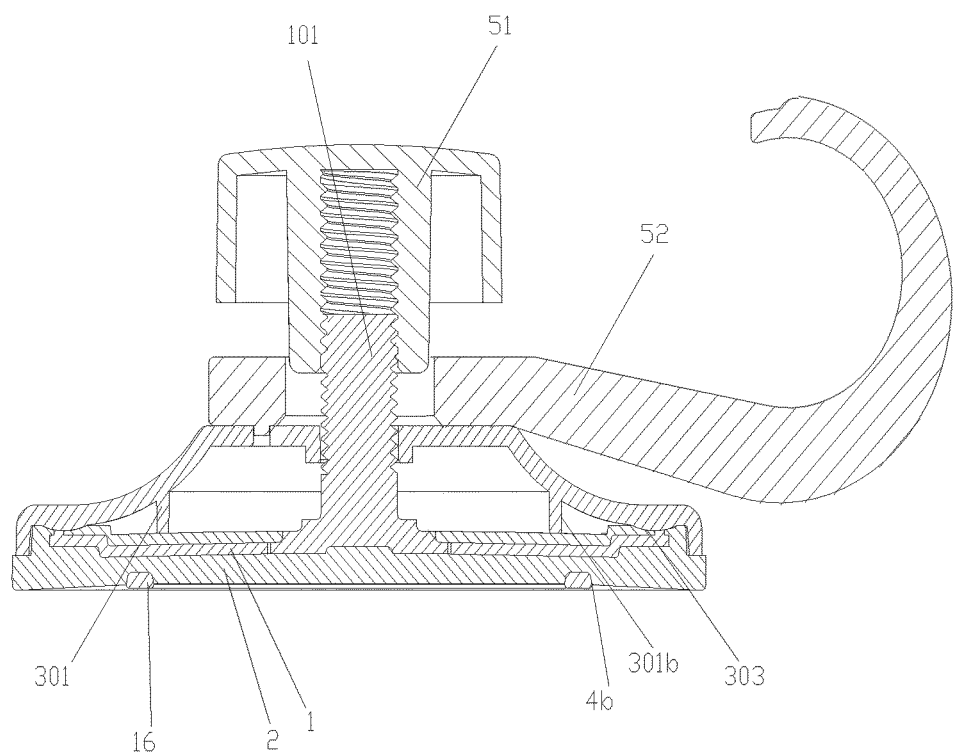
Figures 4, 5:
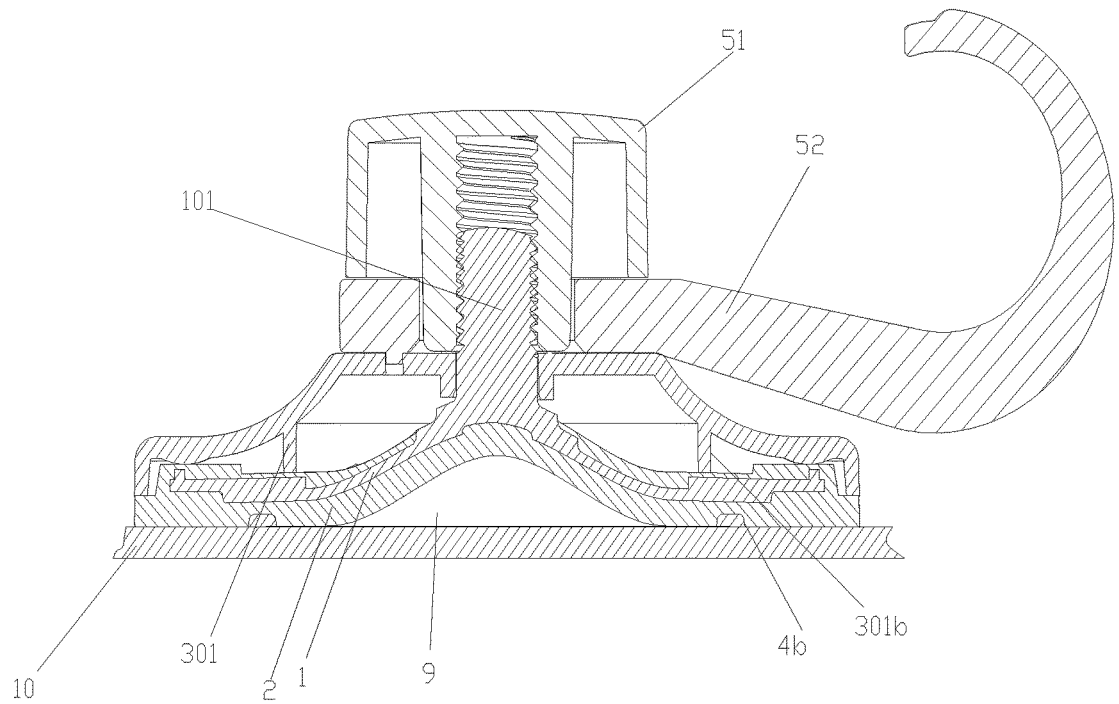

As shown in FIG. 5, FIG. 5-1, and FIG. 5-2, the difference between embodiment 3 and embodiment 2 is described as follows: the sealing element is a sealing gasket 21 at the center of cup body 2's adsorption surface, with a contact friction surface 30 formed between sealing gasket 21 and the edge of the cup body. With the suction cup closely attached to the supporting surface, outer ring surface 301b of central protruding ring 301 on suction cup cover is at inner side of sealing gasket 21 outer side 4ba.

As shown in FIG. 5-1, the cup cover has an inner surface 501 and the flat framework has an inner surface 503. The central protruding ring 301 has an outer side 507 aligned vertically within inner side 505 of recess 509 on the adsorption surface of the cup body.

Embodiment 4

Figure 6:
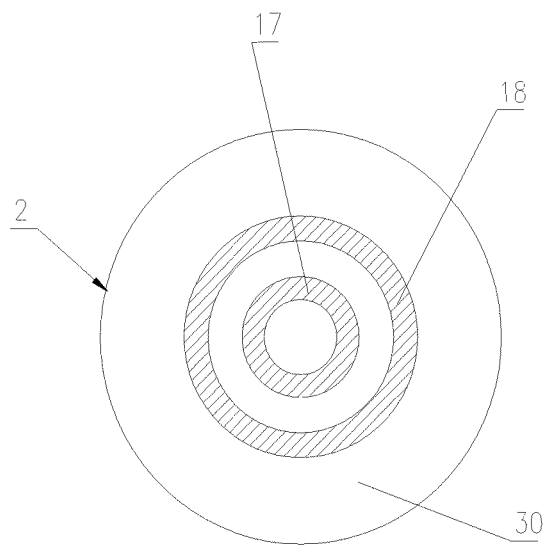
FIG. 6 is a bottom view of suction cup body's adsorption surface of embodiment 4 of the invention.

As shown in FIG. 6, the difference between embodiment 4 and embodiment 2 is described as follows: the seals are sealing ring 17 and seal ring 18 of different sizes, and the installation grooves are two annular grooves corresponding to these sealing rings, respectively, both enclosing the center of suction cup body 2's adsorption surface. Contact friction surface 30 is formed between the larger sealing ring 18 and edge of cup body 2.

Embodiment 5

Figure 7:
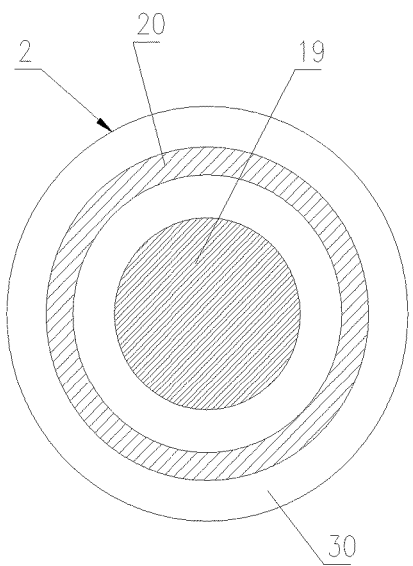
FIG. 7 is a bottom view of suction cup body's adsorption surface of embodiment 5 of the invention.

As shown in FIG. 7, the difference between embodiment 5 and embodiment 4 is described as follows: the seal element is one sealing gasket 19 and one sealing ring 20. Sealing gasket 19 is located at center of the cup body's adsorption surface. One annular groove is provided for installation of the sealing ring. Sealing ring 20 encloses sealing gasket 19. Contact friction surface 30 is formed between sealing ring 20 and the edge of cup body 2.

Embodiment 6

Figure 8:
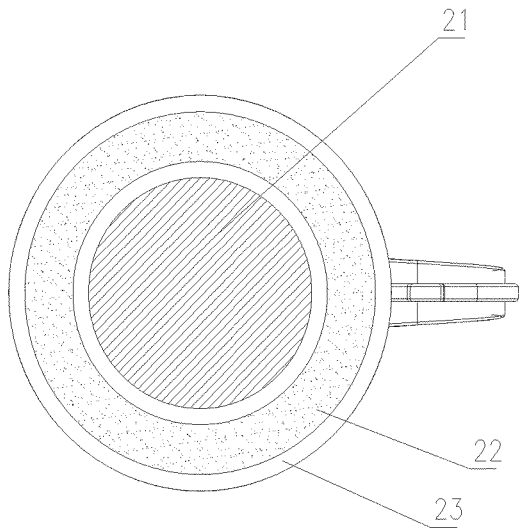
FIG. 8 is a bottom view of suction cup body's adsorption surface of embodiment 6 of the invention.
Figures 1, 8:
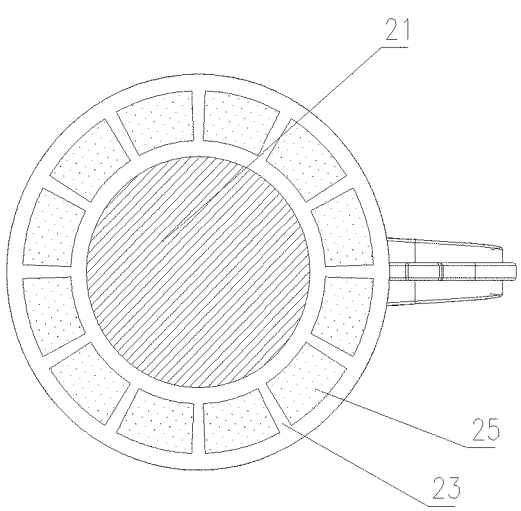
Figures 2, 8:
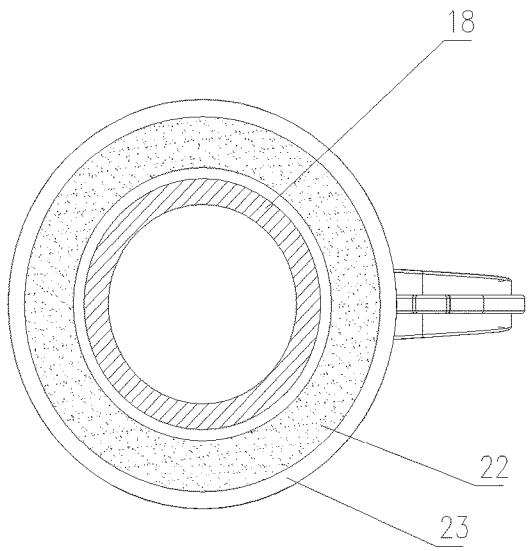
Figures 3, 8:
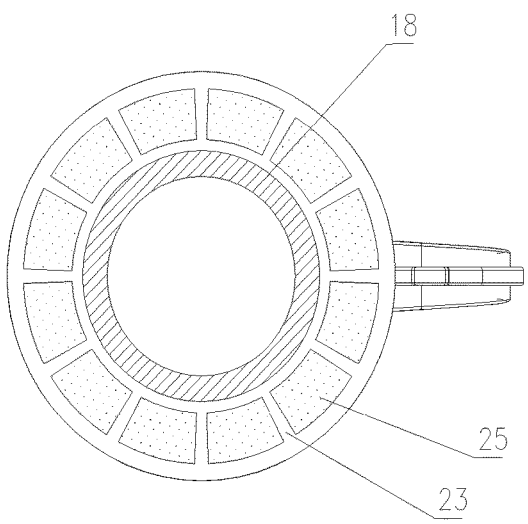
Figure 9:
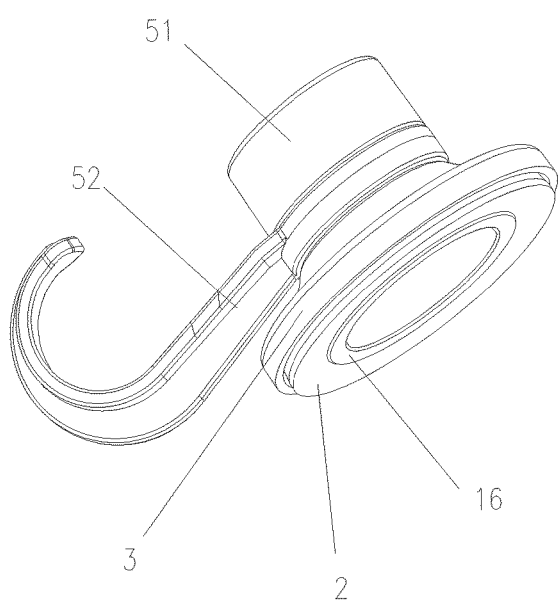
FIG. 9 is an overall structural diagram of embodiment 2 of the invention.
Figure 10:
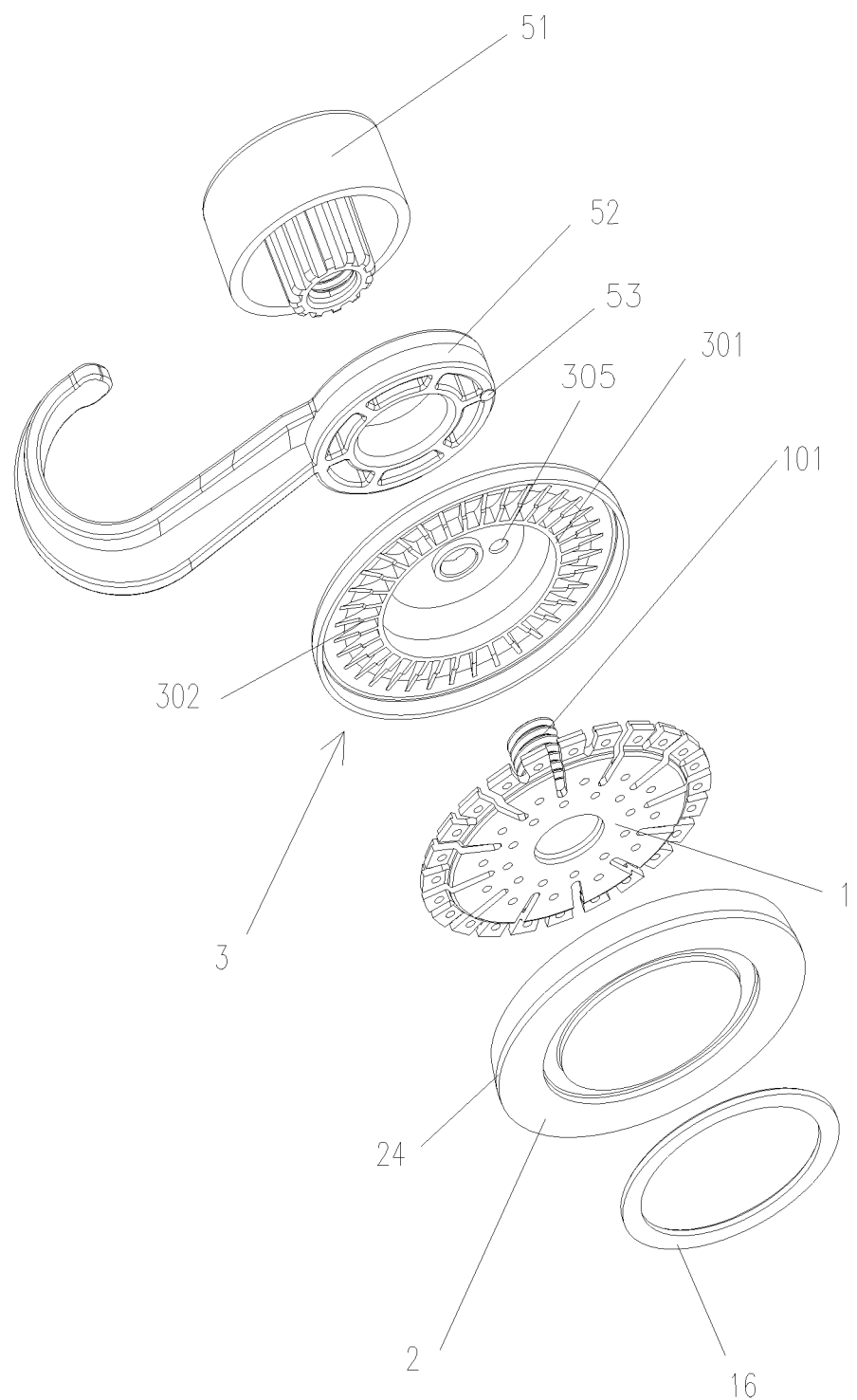
FIG. 10 is an exploded view of embodiment 2 of the invention.
Figure 11:
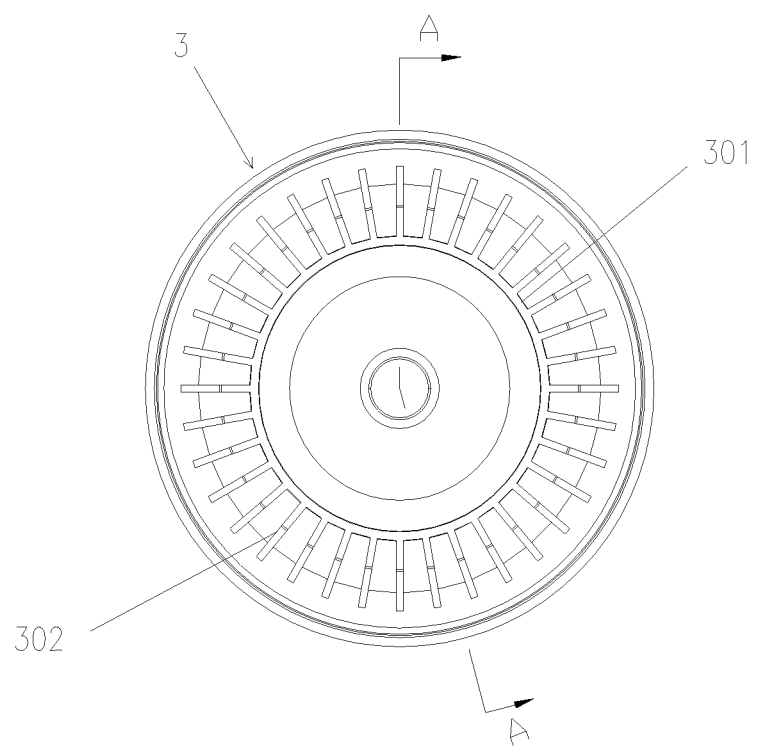
FIG. 11 is a bottom view of the cup cover of embodiment 2 of the invention.
Figure 12:
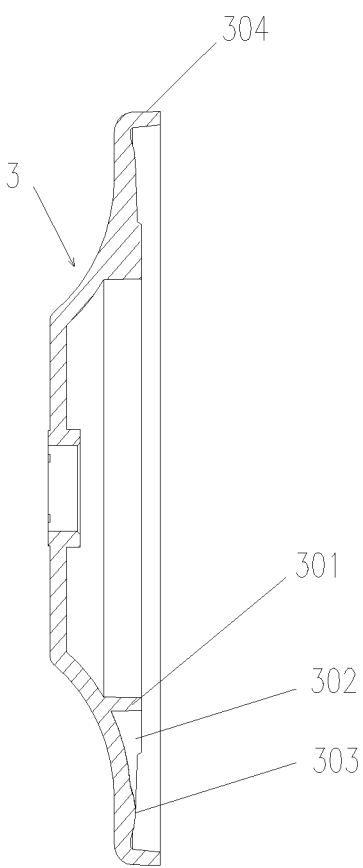
FIG. 12 is A-A line section view in FIG. 11.

As shown in FIG. 8, the difference between embodiment 6 and embodiment 3 is described as follows: an annular coarse area 22 is provided on the cup body's adsorption surface near its edge. A smooth area 23 is provided between the annular coarse part 22 and the edge of the adsorption surface. In this embodiment, annular coarse area 22 forms a complete ring and the roughness of the surface is formed by eroded veins.

Embodiment 7

As shown in FIG. 8-1, the difference between embodiment 7 and embodiment 6 is described as follows: the annular coarse area comprises a number of rough strips 25 distributed on the circumference and the roughness is formed by net veins on the surfaces. The strips 25 are arranged at intervals, with smooth part 23 between adjacent rough strips 25.

Embodiment 8

As shown in FIG. 8-2, the difference between embodiment 8 and embodiment 6 is described as follows: on the cup body's adsorption surface, sealing ring 18 enclosing the center of the adsorption surface is provided and annular rough area 22 encloses sealing ring 18.

Embodiment 9

Figure 3:
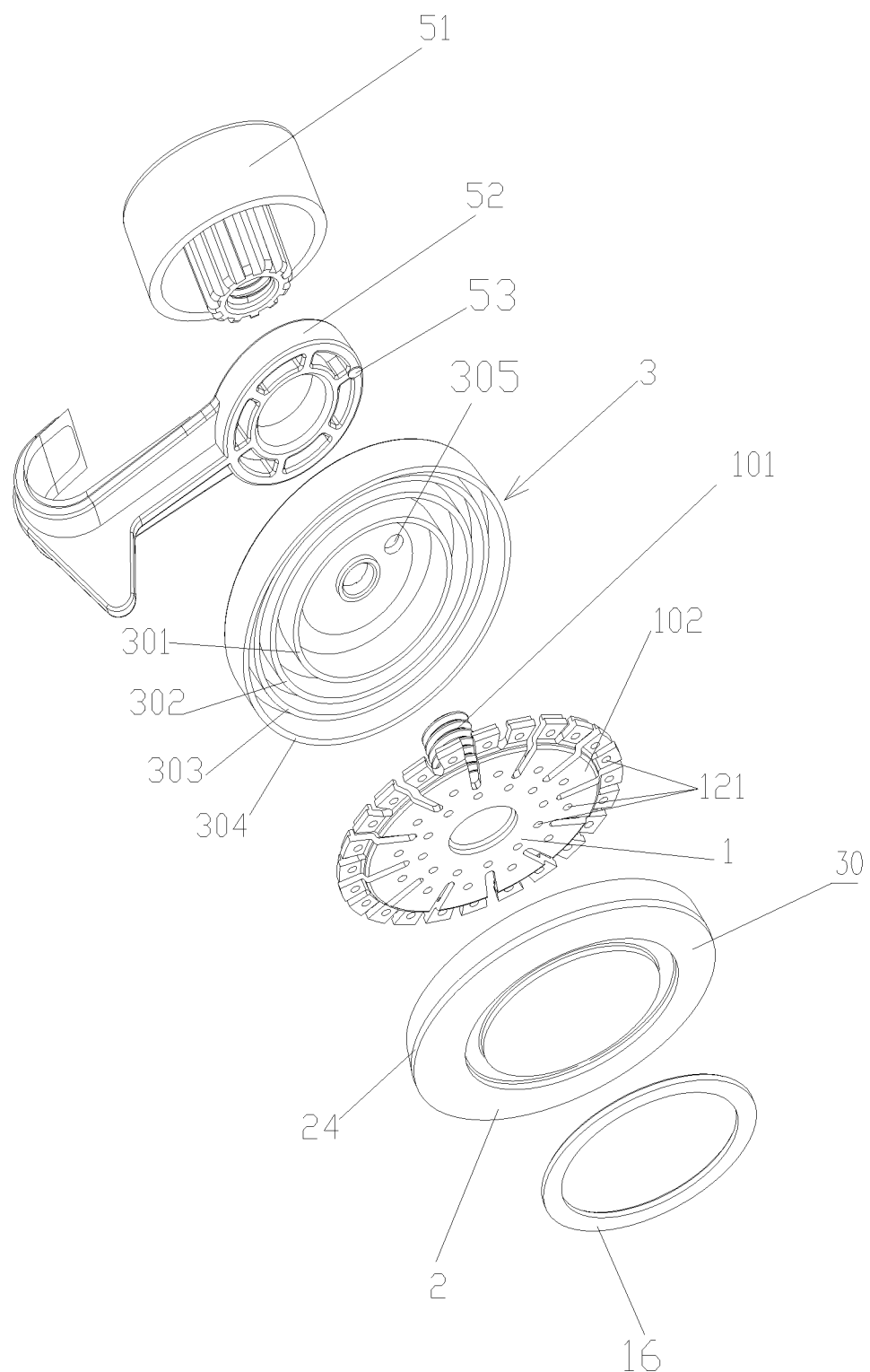
FIG. 3 is an exploded view of embodiment 1 of the invention.
Figure 4:
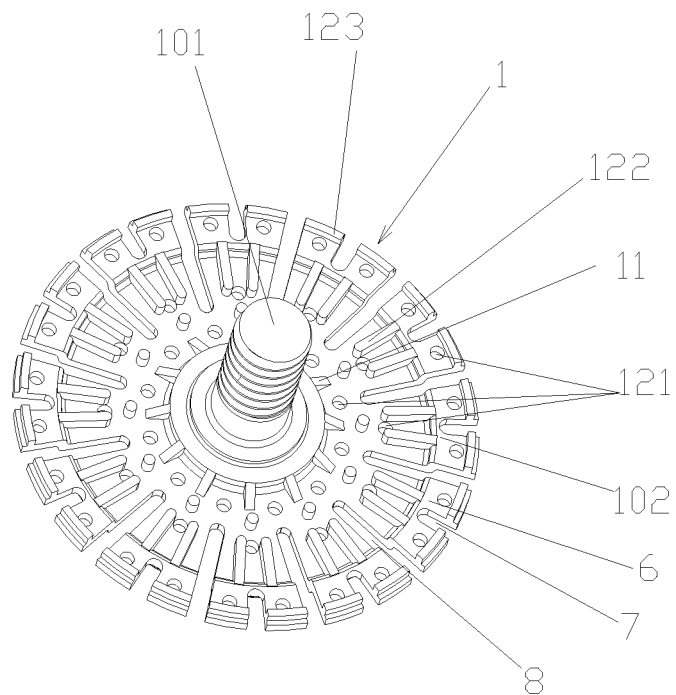
FIG. 4 is a structural diagram of the framework of embodiment 1 of the invention.

As shown in FIG. 8-3, the difference between embodiment 9 and embodiment 7 is described as follows: on the cup body's adsorption surface, sealing ring 18 enclosing the center of this adsorption surface is provided and the rough strips 25 enclose sealing ring 18.

Embodiment 10

Figure 13:
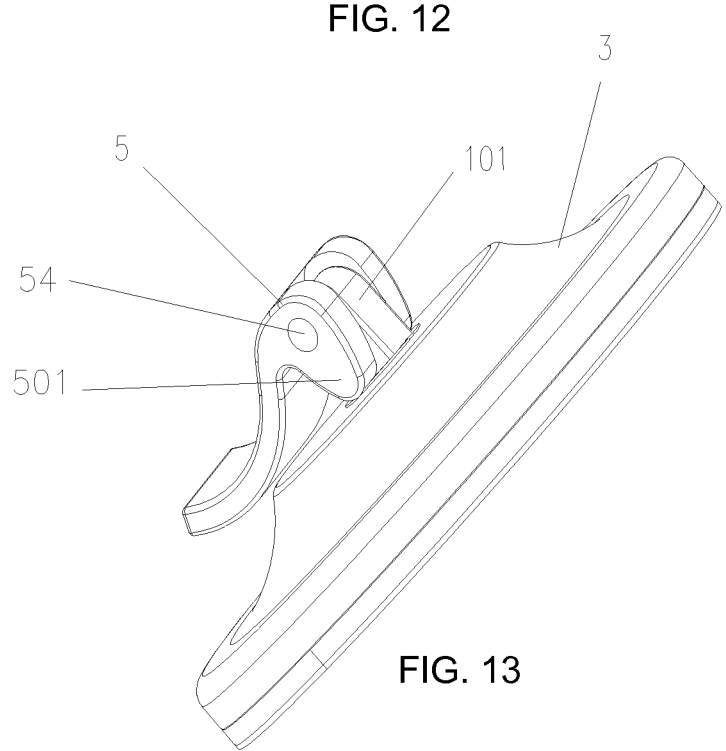
FIG. 13 is an overall structural diagram of embodiment 10 of the invention.
Figure 14:
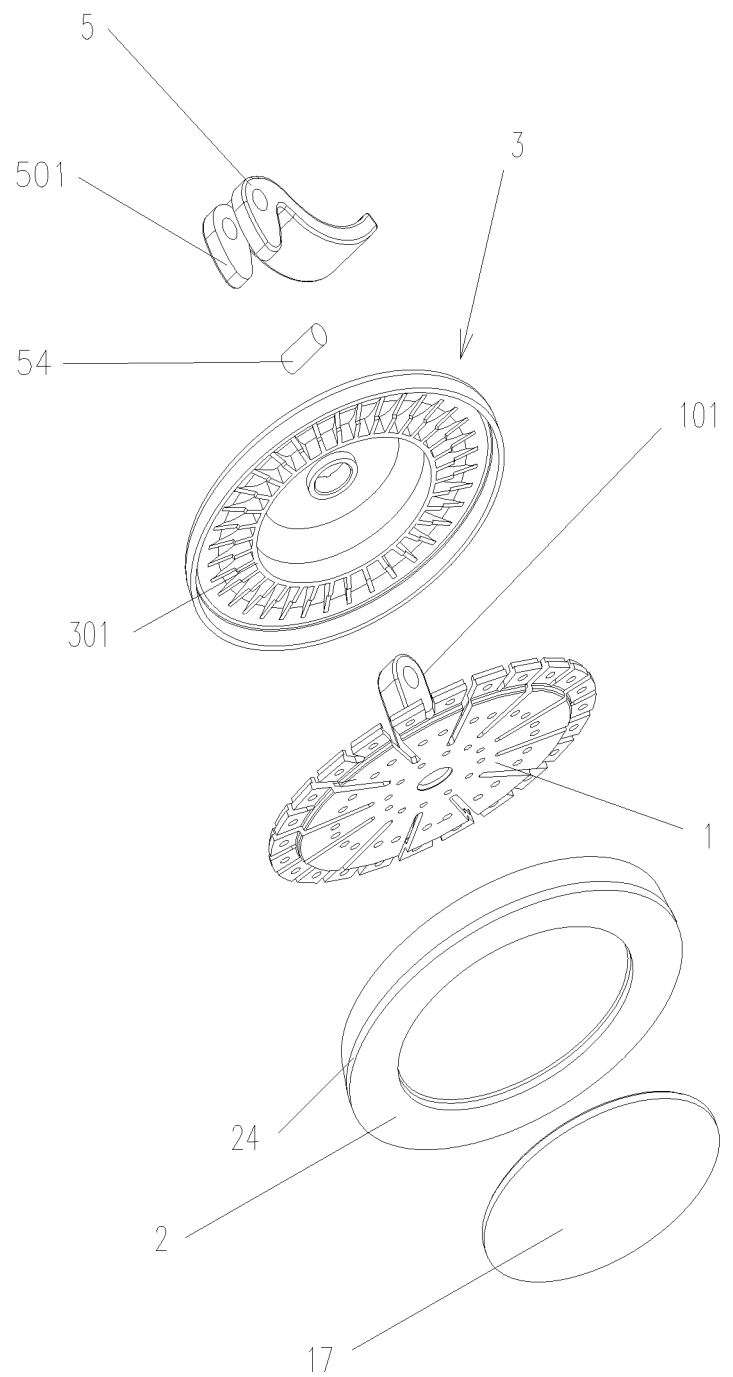
FIG. 14 is an exploded view of embodiment 10 of the invention.

As shown in FIG. 13 and FIG. 14, the difference between embodiment 10 and embodiment 3 is described as follows: pressing element 5 is hinged to connecting rod 101 via shaft pin 54 and the connecting end of pressing element 5 has the shape of a cam. After placing the suction cup body on the supporting surface, protruding part 501 of the connecting end is pressed on the back surface of the cup cover to pull the connecting rod and deform the cup body.

In other embodiments, in case the seal element is seal rings, the number of the sealing rings shall be determined according to actual conditions, and a number of annular grooves of different sizes shall used accordingly. Annular coarse areas can also have other structures. Length of short cuts is ⅓~¾ that of long cuts. On the edge of the back surface of the framework, annular protruding ribs are provided and wrapped in the cup body. Positions of protruding rings correspond to positions of these annular protruding ribs, which receive pressing force from suction cup cover via suction cup body. The more of Y-shaped forks, the weaker is the whole framework. However, a smaller quantity of Y-shaped forks will adversely affect the adsorptive force of the suction cup. Therefore, the optimal number of Y-shaped forks shall be determined according to actual conditions.

Embodiments of this invention are not limited to the above. According to above disclosure of the invention and ordinary technical knowledge and skill, and without deviating from above basic technical concept of this invention, many other forms of modification, replacement, or variation of this invention can be made, which shall fall within the protection scope of this invention.

What is claimed is:

1. A suction cup, comprising:
   a substantially flat framework, a cup body covering said substantially flat framework, a cup cover including a circular flat to portion adjacent to a concave outer portion; wherein said cup cover covering said cup body,
   a pressing element on said cup cover,
   a connection rod passing through both said cup cover and the top layer of said cup body and connected to said substantially flat framework,
   a seal element and at least one protruding ring extending from an inner surface of said cup cover,
   wherein said cup body comprises an adsorption surface with a recess to accommodate said seal element to reduce a distance between said seal element and said at least one protruding ring to receive a pressing force therefrom, and
   wherein said substantially flat framework extends radially with a peripheral sandwiched between said seal element and said at least one protruding ring to form a rigid configuration for transferring said pressing force from said at least one protruding ring to said seal element, a plurality of annularly distributed protruding ribs around an inner surface area of said peripheral of said substantially flat framework, and a plurality of through holes, corresponding to said annularly distributed protruding ribs, in said cup body for said annularly protruding ribs to extend through said through holes so that said at least one protruding ring of said cup cover and said annularly protruding ribs of said substantially flat framework are in direct contact to transfer said pressing force from said at least one protruding ring.

2. The suction cup according to claim 1, wherein said annular protruding ribs comprise two concentric circles, an inner protruding rib circle and an outer protruding rib circle enclosing said inner protruding rib circle, said annular protruding ring is in a form of two concentric ring elements comprising an inner protruding ring element and an outer protruding ring element positioned corresponding to said inner protruding rib circle and outer protruding rib circle, respectively, so that when a force is applied to said pressing element, said force pulls said connection rod and deforms said cup body in its central area to form a vacuum cavity thereunder while at the same time said force is also transferred from said inner and outer annular protruding ring elements of said cup cover to said inner and outer annular protruding rib circles of said substantially flat framework to counteract on said cup body and limit its deformation in its peripheral area above said seal element so that said seal element in said adsorption surface remains pressed against an attachment surface.

3. The suction cup according to claim 2, further comprising a central protruding ring on the inner surface of said cup cover, enclosed within said inner protruding ring element.

4. The suction cup according to claim 3, wherein an outer side of said central protruding ring is aligned vertically with an inner side of said recess when the suction cup in a suction state.

5. The suction cup according to claim 4, wherein said seal element is protruding from the adsorption surface of said cup body and there is an annular friction surface formed on the adsorption surface outside said seal element.

6. The suction cup according to claim 5, wherein said recess is in a form of an annular groove on the adsorption surface of said cup body and said seal element is installed in said groove and protrudes out of an opening of said groove.

7. The suction cup according to claim 6, wherein said seal element has a higher bonding strength than a bonding strength of said cup body.

* * * * *